US012528017B1

(12) United States Patent
Zebuhr

(10) Patent No.: US 12,528,017 B1
(45) Date of Patent: Jan. 20, 2026

(54) SYSTEM FOR AVATAR CLONING IN VIDEO GAMES AND ENTERTAINMENT APPLICATIONS

(71) Applicant: Chad Zebuhr, Apex, NC (US)

(72) Inventor: Chad Zebuhr, Apex, NC (US)

( * ) Notice: Subject to any disclaimer, the term of this patent is extended or adjusted under 35 U.S.C. 154(b) by 0 days.

(21) Appl. No.: 19/224,823

(22) Filed: Jun. 1, 2025

Related U.S. Application Data

(60) Provisional application No. 63/673,841, filed on Jul. 22, 2024.

(51) Int. Cl.
*A63F 13/58* (2014.01)
*A63F 13/35* (2014.01)

(52) U.S. Cl.
CPC .............. *A63F 13/58* (2014.09); *A63F 13/35* (2014.09)

(58) Field of Classification Search
CPC ................................ A63F 13/35; A63F 13/58
See application file for complete search history.

(56) References Cited

U.S. PATENT DOCUMENTS 8,192,286 B2 6/2012 Dhunjishaw et al.
8,388,440 B2 3/2013 Patterson
8,577,737 B1 11/2013 Amacker et al.
9,095,779 B2 8/2015 Chan et al.
9,731,206 B2 8/2017 Paracha et al.
9,827,493 B2 11/2017 Green et al.
10,737,180 B1 8/2020 Noland et al.
11,065,539 B2 7/2021 Sherwani et al.
11,141,664 B1 * 10/2021 Koch .................... H04L 9/3236
2007/0293319 A1 12/2007 Stamper et al.
2010/0029371 A1 2/2010 Medvinsky et al.
2019/0282895 A1 9/2019 Choudhary et al.
2019/0333261 A1 * 10/2019 Nakashima ............. G06F 3/011
2022/0072243 A1 3/2022 Ribeiro et al.
2024/0281052 A1 * 8/2024 Le Chevalier .......... G06F 3/011

FOREIGN PATENT DOCUMENTS

KR 20190117046 A 10/2019

* cited by examiner

*Primary Examiner* — Thomas H Henry
(74) *Attorney, Agent, or Firm* — Bold IP, PLLC; Christopher Mayle

(57) ABSTRACT

A system and method for video games or other interactive entertainment that permits a user to temporarily use or rent a copy of a high-level character, avatar, or other virtual asset of a source user, permitting casual video game players such as a divorced parent to temporarily use a well-developed account without investing the time and money required to level up or advance such an account, whereby the assets may include avatars, skins, items, weapons, or other materials.

24 Claims, 4 Drawing Sheets

SYSTEM FOR AVATAR CLONING IN VIDEO GAMES AND ENTERTAINMENT APPLICATIONS

CROSS REFERENCE TO RELATED APPLICATIONS

This application claims priority to U.S. Provisional Patent Application No. 63/673,841 filed Jul. 22, 2024, which is incorporated in its entirety.

FIELD OF DISCLOSURE

The overall field of this invention generally relates to systems and methods for video games and more particularly to a system for cloning or copying a video game asset or assets, and permitting additional users to temporarily access those assets for enhanced gameplay.

BACKGROUND

The video game industry has experienced explosive growth, becoming a $350+ billion revenue powerhouse over the past few years. For the first generation that grew up with gaming as a norm, priorities have shifted due to careers, families, and other adult responsibilities. Despite this, the industry continues to expand, with developers investing millions in large-scale projects and marketing campaigns. Esports have also flourished, offering prize pools exceeding $20 million for professional players. The live service model has become dominant, with developers continuously updating games to maximize revenue from a single intellectual property.

However, this growth has brought challenges, particularly for time-constrained adult gamers. Modern games often demand significant time investments for character progression, equipment acquisition, and other advancements. This creates barriers for various player scenarios: parents wanting to play with their children but lacking equivalently leveled characters, casual players unable to keep pace with friends who have more gaming time, new players deterred by the grind required to explore high-level gameplay, fans of professional players wishing to experiment with pro-level builds and gear, consumers interested in trying premium cosmetics before purchasing, and groups seeking to compete against professionals on an equal footing. These scenarios highlight a growing disconnect between the industry's time-intensive models and the evolving needs of its maturing player base.

Thus exists the need for a system that would allow players to clone other assets of one or more specific users within a given game or series of games. This would allow players to join friends who are more advanced, kids who have put more time in than them, other players in endgame experiences, and a myriad of scenarios purely for the fun of playing with someone else's avatar or virtual asset.

SUMMARY

It is an object of the present description to provide a system where a virtual asset is able to be cloned or copied for any or all of the events interactions that it has either with the player, other characters, non-player characters (NPCs), or game match experiences/results. The virtual asset may be in the form of weapons, potions, cash, chattel, precious valuables, personal property, real property, vehicles, titles, jobs, progressions, cosmetics, user setters, and the like. In-game assets may also include mythical and fantasy entities, such as manna, magical items, potions, relics, artifacts, and the like. The cloned virtual character or asset is then able to interact with other characters or asset for a predetermined amount of time or when an in game or out of game event occurs. The cloned asset may operate based off a static snapshot of the source asset when it was accessed, or may be modified based on system of developer settings in real time with constant updating based on the source asset's input.

The cloned virtual character or asset is then able to interact within the game from which the original character or asset was cloned. Cloned virtual players or virtual assets may be restricted access to certain game activities such as in-game events, trading, marketplaces, PVP, and communication. The rental pauses or terminates when the predetermined conditional end has been met. This may be a specified rental period (time), or it may occur when a predetermined in-game or out of game criteria has been met.

In accordance with one or more embodiments, a system includes a computer system. The computer system includes at least one processor and a memory coupled to at least one processor. The memory stores program instructions that are executable by at least one processor to cause the computer system to perform tasks. The tasks include: 1) enabling a first user, via a first gaming device, to initiate a gaming session of a gaming service application using an account of the first user; 2) enabling the intermediary to clone the virtual character or virtual asset to the marketplace for use by other users; and 3) ending the second user's access to the cloned virtual character or virtual asset based on predetermined conditions.

In some aspects, the techniques described herein relate to a system for cloning and renting a virtual asset in a video game, including: a server computer system including at least one processor and memory storing program instructions executable by the at least one processor to perform operations including: storing source data associated with the virtual asset of a first user; creating a template for cloning the virtual asset using one or more template control filters that define rules for copying the source data; generating a filtered copy of the virtual asset based on the source data and the template control filters; providing a marketplace interface accessible to a plurality of users for listing and renting the filtered copy of the virtual asset; receiving a rental request from a second user to temporarily access the filtered copy of the virtual asset; in response to the rental request, establishing a cloning session that enables the second user to use the filtered copy of the virtual asset for a predetermined rental period; and terminating the second user's access to the filtered copy of the virtual asset when the predetermined rental period ends.

In some aspects, the techniques described herein relate to a system, wherein the template control filters include at least one of: content filters that specify what type of attributes are included in the filtered copy; formatting filters that specify visual distinctions between the virtual asset and the filtered copy; and behavioral filters that specify how the second user can interact with the filtered copy.

In some aspects, the techniques described herein relate to a system, wherein the operations further include: receiving, during the cloning session, updates to the virtual asset made by the source user; translating the updates into corresponding modifications for the filtered copy; and applying the corresponding modifications to the filtered copy in real-time.

In some aspects, the techniques described herein relate to a system, wherein the operations further include: restricting the filtered copy from accessing at least one of: in-game events, trading functions, marketplace functions, player-versus-player functions, and communication functions.

In some aspects, the techniques described herein relate to a system, wherein the predetermined rental period is a specified time duration.

In some aspects, the techniques described herein relate to a system, wherein the predetermined rental period is a specific in-game task.

In some aspects, the techniques described herein relate to a system, wherein the predetermined rental period is a specific in-game event.

In some aspects, the techniques described herein relate to a system, wherein the operations further include: enabling the second user to search and filter available virtual assets for rental based on attributes including parameters that are included of one of the following: level, cosmetics, skills, equipment, reputation, power, inventory, currency, and achievements.

In some aspects, the techniques described herein relate to a system, wherein the operations further include: analyzing level data of the virtual asset of the first user; and adjusting the level of the filtered copy based on a relative skill level between the first user and the second user and then applying the adjusted level to the filtered copy before providing access to the second user; generating multiple filtered copies of a same virtual asset at different level adjustments; displaying the multiple filtered copies in the marketplace interface with different rental prices based on the level adjustments; and scaling the level to match a target game difficulty.

In some aspects, the techniques described herein relate to a method for temporarily providing access to virtual assets in video games, including: storing, by a computer system, source data associated with the virtual asset of a first user; generating, by the computer system, a filtered copy of the virtual asset based on template control filters; listing, by the computer system, the filtered copy on a marketplace accessible to a plurality of users; receiving, by the computer system, a rental request from a second user to temporarily access the filtered copy; and establishing, by the computer system, a cloning session that enables the second user to use the filtered copy for a predetermined rental period.

In some aspects, the techniques described herein relate to a method, further including: synchronizing, during the cloning session, changes made to the virtual asset by the first user with the filtered copy used by the second user.

In some aspects, the techniques described herein relate to a method, wherein the template control filters modify at least one attribute of the virtual asset in the filtered copy relative to the virtual asset of the first user.

In some aspects, the techniques described herein relate to a method, wherein the predetermined rental period is based on a specific gaming session or event involving the first user.

In some aspects, the techniques described herein relate to a system for enabling sharing of assets in video games, including: a marketplace interface configured to display virtual assets available for temporary use; a filtering module configured to generate filtered copies of the virtual asset based on template control filters; a rental processing module configured to handle transactions between virtual asset owners and renters; and a cloning session manager configured to establish temporary access to the filtered copies for the renters.

In some aspects, the techniques described herein relate to a system, further including a synchronization module configured to update the filtered copies in real-time based on changes made to original virtual assets by their owners.

In some aspects, the techniques described herein relate to a system, further including: a permission management module configured to restrict the filtered copies from accessing specific game functions based on rules set by game developers or the virtual asset owners.

In some aspects, the techniques described herein relate to a system, further including: an invitation module configured to: present a selectable icon on a user interface of a computing device of a first user; receive a selection of the selectable icon; generate a copying invitation in response to the selection; transmit the copying invitation to a second user via a gaming service; and enable the computing device of the second user to display rental terms including at least a price and a rental duration; and process an acceptance input from the second user; wherein the cloning session manager establishes a cloning session between the first user and the second user in response to the acceptance input.

In some aspects, the techniques described herein relate to a system for enabling virtual asset rentals through application programming interfaces, including: a computing device configured to execute: a game application that provides an interactive video gaming experience; a gaming service application programming interface (API) configured to communicate with a gaming service; and a cloning service API configured to communicate with a cloning service; wherein the game application is configured to: utilize the gaming service API to access features provided by the gaming service including online gaming; call one or more methods exposed by the cloning service API to: initiate a cloning session with the cloning service; provide virtual asset data to the cloning service; receive filtered virtual asset data from the cloning service for use by a requesting user; load the filtered virtual asset data into a game state of the game application; and enable the requesting user to control the filtered virtual asset within the game application for a predetermined rental period.

In some aspects, the techniques described herein relate to a system, further including: a cloning component executed by the computing device and configured to: interface between the cloning service API and the game application; manage data transformations between formats used by the game application and formats required by the cloning service; and handle authentication processes required to establish secure communication with the cloning service.

In some aspects, the techniques described herein relate to a system, wherein the game application implements permissions checking through the gaming service API to verify rental authorization before loading the filtered virtual asset data; and the permissions checking includes validating at least one of: rental duration, rental payment status, content restrictions, or game mode restrictions.

In some aspects, the techniques described herein relate to a system, wherein: the gaming service API and the cloning service API operate together to synchronize updates between an original virtual asset and the filtered virtual asset controlled by a second user.

In some aspects, the techniques described herein relate to a system, wherein when changes are made to the original virtual asset during the cloning session, the changes are: transmitted via the cloning service API; processed by the cloning service; filtered according to template control filters; and applied to the filtered virtual asset in real-time.

In some aspects, the techniques described herein relate to a system, wherein the game application is further configured to initiate a second cloning session with the cloning service;

provide a second virtual asset data to the cloning service; receive a filtered second virtual asset data from the cloning service for use by the requesting user; load the second filtered virtual asset data into the game state of the game application; and enable the requesting user to control the second filtered virtual asset within the game application for the predetermined rental period along with the filtered virtual asset.

In some aspects, the techniques described herein relate to a system, wherein the system provides for multiple assets wherein a second filtered virtual asset comes from a different source than the filtered virtual asset.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
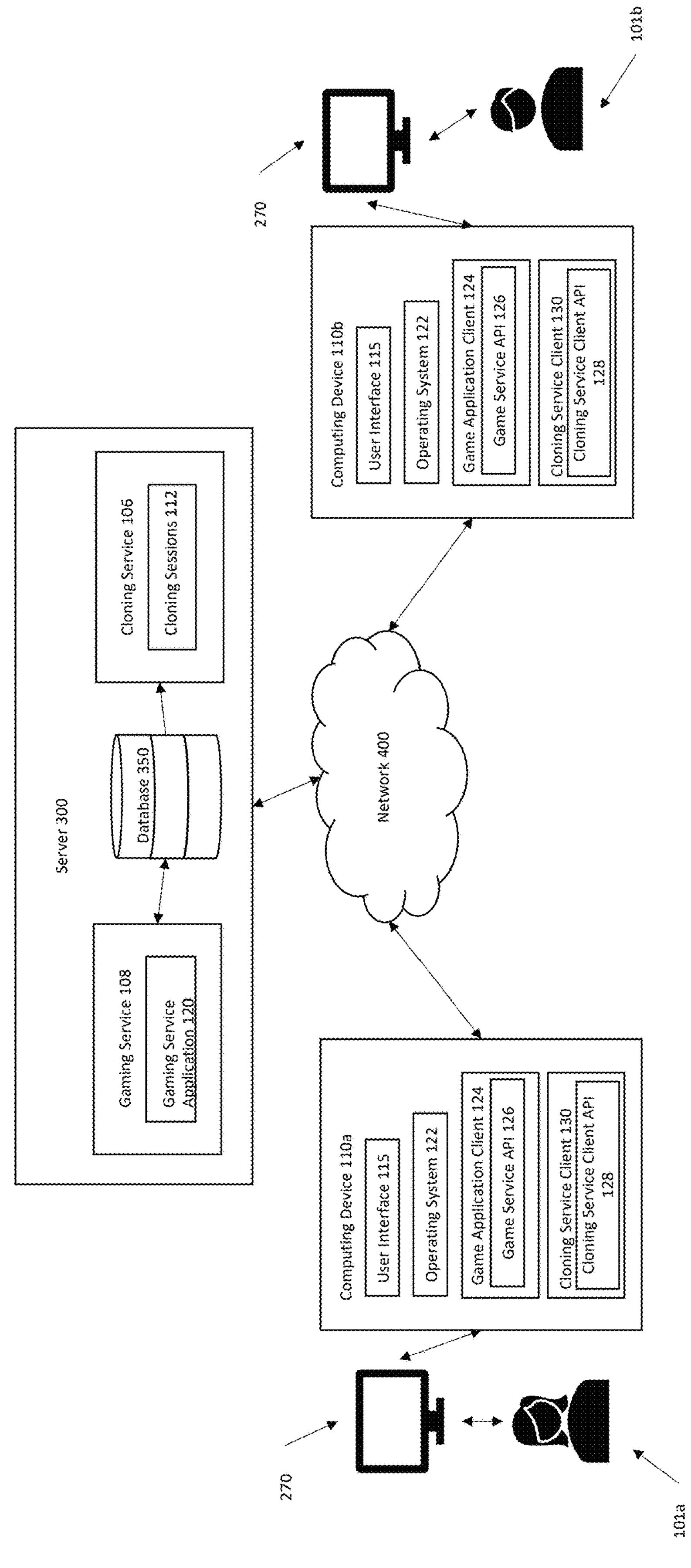
FIG. 1 shows a block diagram of the various connected systems of the interactive character cloning system.

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skills in the art to which this disclosure pertains.

The present invention is directed to a system for video games or other interactive entertainment that permits a user to temporarily use or rent a copy of a high-level character, avatar, or other virtual asset of an original source. The invention permits casual video game players such as a divorced parent to temporarily use a well-developed account without investing the time and money required to level up or advance such an account. The assets may include avatars, skins, items, weapons, or other materials. The system may include a rental service on an interactive marketplace where users may view virtual characters of friends or anybody in the world.

The marketplace may be integrated into an online multi-player game or operating system, allowing the developer, intermediary, or users 101 to rent the developed game characters of users 101 to others. This creates a thriving economy centered around character progression and customization whereby the characters of users 101 can be listed for rent, complete with detailed information about levels, skills, equipment, and achievements visible on the marketplace. Potential renting users 101 may search and filter through listings using various criteria, preview characters in detail, and potentially test them in a controlled environment before making a rental. The marketplace may employ a secure trading system with an escrow service to ensure safe transactions, while an AI-driven valuation algorithm helps suggest fair pricing based on character attributes and market trends.

Referring initially to FIG. 1, one or more embodiments of interactive virtual character cloning system 100 in accordance with the present invention is illustrated. Interactive virtual character cloning system 100 is illustrated as a simplified block architecture diagram consistent with the embodiments of the present disclosure. Interactive virtual character cloning system 100 may include a plurality of computing devices 110 operated by users 101 such as computing device 110*a* operated by user 101*a* and computing device 110*b* operated by user 101*b*. Throughout this specification, user 101*a* will be designated as the source user providing the virtual character while user 101*b* will be the receiving user who is given access to the cloned virtual character through the marketplace. The term user is non-limiting and instead may be artificial intelligence or any other entity such as an animal whereby any virtual asset is uploaded to the system by any means.

Computing devices 110 may be any number of gaming devices and may include, for example, a processor, for example a central processing unit based on 80×86 architecture as designed by Intel™ or AMD™, or a system-on-a-chip as designed by ARM™. The processor may be communicatively coupled to auxiliary devices or modules of computing devices 110, using a bus or other coupling method. Optionally, the processor and some or all of its coupled auxiliary devices or modules may be housed within or coupled to a housing of the computing devices 110.

Computing devices 110 may be any device that includes but is not limited to, any non-transitory computer-readable medium such as a gaming console, desktop computer, laptop computer, mobile phone, any other mobile device, or any other electronic device under the philosophy of the internet of things. Computing devices 110 and users 101 may be located in various geographical locations that are either located apart or are located in proximity to each other. As used herein, the terms user and player may be used interchangeably.

In some embodiments, a graphical user interface 115 (GUI) may be accessed from computing devices 110. User interface 115 may be designed for providing user control input to a game process operated by a game engine executing on the processor. User interface 115 may have a plurality of buttons or icons that are selectable through user interface 115 for interactive virtual character system 100 to perform particular processes in response to the selections. User interface 115 may include but is not limited to a heads-up display, title bars, toolbars, pull-down menus, tabs, scroll bars, content help, dialog boxes, operating buttons (icons), control settings, and status bar that the user navigates throughout the display.

In some non-limiting embodiments, computing devices 110 may be in communication with one or more servers, such as server 300 via one or more networks such as network 400. Server 300 may be located at a data center or any other location suitable for providing service to network 400 whereby server 300 may be in one central location or in many different locations in multiple arrangements. Server 300 may include a database server such as MySQL® or Maria DB® server. Server 300 may have an attached data storage system storing software applications and data.

Server 300 may include a front-end web server that is coupled to computing devices 110 and other devices via a network such as the Internet. The front-end web server may provide services, including ticketing and other non-essential services, and login services.

In some embodiments, server 300 may include a back-end web server that is coupled to a computing device 110 via the Internet. The back-end web server may be on the same network or the same machine as a database server. The database server may process and/or store customer and/or asset information associated with the virtual character.

Server 300 may have a number of modules that provide various functions related to interactive virtual character system 100. Modules may be in the form of software or computer programs that interact with the operating system of server 300 whereby data collected in databases 350 as instruction-based expressions of components and/or processes may be processed by one or more processors within server 300 or another component of computing devices 110 as well as in conjunction with execution of one or more other computer programs. Modules may be configured to receive commands or requests from computing devices 110, server 300, and outside connected devices over network 400.

Server 300 may include storage for providing services to users 101 at connected user systems and managing the network accounts of users 101. Some or all of the resources and services provided by server 300 may be restricted. Server 300 controls access to these restricted resources and services so that only accounts with current proper credentials are permitted to access copied or cloned resources or services. Server 300 may create and manage accounts for users. Server 300 may be connected to and maintain an account database storing account information (e.g., information identifying the user for the account, the type of account, the current access level of the account, the permanent or default access level of the account, and the current user system for the account). Server 300 may create and manage subscription information for users, such as in local storage or in the account database. Alternatively, server 300 has access to subscription information through the network 400. The subscription information indicates permissions for the user, including what types of network accounts the user is permitted to clone. The server 300 also manages linking accounts and sharing access privileges among linked accounts.

Server 300 may have a control module with appropriate firmware or software and an operating system to control overall operation and configuration of interactive virtual character system 100. The controller module may be in operable communication with a network interface module which provides interface functionality over one or more networks (wired or wireless) and possibly connectivity with other communication media. The controller module may also be in communication with an audio module and a video module, which receive and process audio and video data, respectively, from one or more connected video cameras or other input devices for users 101 on computing devices 110.

Database 350 represents a series of data that is managed by a database management system, also called electronic database, and are structured to facilitate the storage, retrieval, modification, and deletion of data in conjunction with various data-processing operations of various interactive games including the updated profile of one or more virtual characters associated with the user. The database is an organized collection of data, generally stored and accessed electronically from various components connected over network 400. Database 350 may be physically or logically divided into one or more separate databases.

Server 300 may have a management module to manage sharing of data information between interactive games played by users 101. This may include, for example, detecting conditions that trigger the transmitting of a virtual character when a user is attempting to start different games and providing parameters to interactive games, optionally via network 400. Databases 350 may act as an interconnected database system. Databases 350 may store information provided by the user and use it for prompt pre-processing. Database 350 may store information learned from another character or NPC and use it for prompt pre-processing. Database 350 may store 3D character physical animation information. Database 350 may store game statistical information and use it for prompt pre-processing.

Databases 350 may store any number of virtual character parameters including appearance parameters. Appearance parameters may be uniquely assigned to the virtual character and may include, for example, face, body type, body parts, hairstyles, behaviors, voices, animations, or other parameters. Databases 350 may store any number of biological traits such as personality, name, and/or title of the virtual character. Limits may be applied to how much appearance parameters are allowed to change between interactive game environments in different interactives to not dramatically affect the purpose sought out by the interactive.

In one or more non-limiting embodiments, network 400 may include a local area network (LAN), such as a company Intranet, a metropolitan area network (MAN), or a wide area network (WAN), such as the Internet or World Wide Web. Network 400 may be a private network or a public network, or a combination thereof. Network 400 may be any type of network known in the art, including a telecommunications network, a wireless network (including Wi-Fi), and a wireline network. Network 400 may include mobile telephone networks utilizing any protocol or protocols used to communicate among mobile digital computing devices (e.g., computing device 110), such as GSM, GPRS, UMTS, AMPS, TDMA, or CDMA. In one or more non-limiting embodiments, different types of data may be transmitted via network 400 via different protocols. In alternative embodiments, computing devices 110, may act as standalone devices or whereby they may operate as peer machines in a peer-to-peer (or distributed) network environment.

Network 400 may further include a system of terminals, gateways, and routers. Network 400 may employ one or more cellular access technologies including 2nd (2G), 3rd (3G), 4th (4G), 5th (5G), LTE, Global System for Mobile communication (GSM), General Packet Radio Services (GPRS), Enhanced Data GSM Environment (EDGE), and other access technologies that may provide for broader coverage between computing devices 110 if for instance they are in a remote location not accessible by other networks.

Computing device 110*a* and computing device 110*b* may communicate via network 400 to access various services for clone sharing. It should be appreciated that multiple computing devices may receive the cloned virtual assets, all simultaneously or sequentially. For example, computing devices 110 may access a cloning service 106 and/or a gaming service 108. The functionality of the cloning service 106 and the gaming service 108 may be provided by server 300 or any number of other web servers, data storage systems, network appliances, dedicated hardware devices, and/or other server computers or computing devices that do not stray away from the intent of the present invention.

Cloning service 106 may create the cloning session 112 such that computing device 110*a* may share cloned data associated with their account with the computing device 110*b* through a marketplace or directly by a party system or interactive menu. Likewise, this process may be reversed whereby computing device 110*b* may share their cloned assets with computing device 110*a*. Gaming service 108 may facilitate user interaction with one or more gaming service applications 120 that are executed by the gaming service 108. The gaming service application(s) 120 may provide features such as, but not limited to, online and offline cooperative multiplayer gaming, online and offline competitive multiplayer gaming, chat features, messaging features, online leaderboards, achievement tracking features, advertising features, marketplace features, and friends list features. The gaming service application 120 may additionally or alternatively provide or assist in providing a game task delegation feature.

Computing devices 110 may execute an operating system 122 and one or more application programs such as, for example, a game application 124, a gaming service application programming interface ("API") 126, a cloning service API 128, a cloning component 130, and/or other application programs or components. Operating system 122 may be a computer program for controlling the operation of the computing devices 110. The application programs are executable programs configured to execute on top of the operating system 122 to provide various functionality described herein.

The game application 124 may provide an interactive video gaming experience whereby one or more players can control or otherwise interact with visual content that is presented on a display of computing device 110 or a separately connected component. The visual content can include, but is not limited to, characters, levels, maps, areas, stages, worlds, spaces, shapes, and objects. The visual content may be two-dimensional, three-dimensional, or a combination thereof. Game application 124 may provide audial content such as, but not limited to, music, speech, and sound effects. Game application 124 may provide haptic feedback, such as vibration feedback. Game applications may be designed to have one or more game tasks that users 101 may need to complete. A game task can generally include anything one or more players can do by interacting with the visual content provided by game application 124. As a simple example, a game task might be for a player to control a virtual character to traverse a level from a predefined starting point to a predefined end point so as to complete or "finish" a level.

A further game task using this example might be to control the virtual character to traverse a level while avoiding or initiating contact with certain objects or characters (e.g., enemies). It should be understood that these examples are illustrative, and should not be construed as being limiting in any way. Game applications may also be designed to have one or more objectives that can be completed by the player(s). An objective is a game task that is defined by a developer of the game application 124. In other words, an objective is a goal or purpose of the game application 124. The game application 124 may have multiple objectives. An objective can be discrete in that it is not linked in any way to another objective.

Alternatively, an objective may be linked or otherwise combined with one or more other objectives. In some embodiments, the game application 124 provides a sandbox in which the player(s) can create their own game tasks, which may be ongoing or fleeting for the player(s). The sandbox may be provided in addition to established objectives or in lieu thereof. Game application 124 may have one or more achievements. An achievement may be an accolade provided to a player or group of players in recognition of a particular interaction with the game application 124. An achievement can be as simple as starting the game application 124 for the first time (or some other number of times), interacting with certain features provided by the game application 124 (e.g., entering a certain menu or selecting a certain menu option such as a "hard" difficulty level), or completing one or more objectives. When a player performs a particular interaction that is tied to an achievement, the achievement becomes "unlocked." The game application 124 may notify the player(s) of the "unlocked" achievement by presenting an achievement alert. An achievement alert can be presented in a visual, audial, and/or haptic manner. The act of unlocking an achievement may be a game task. Unlocking an achievement may enable the ability to unlock additional achievements.

Input to the game application 124 may be provided via one or more input devices that are connected to or otherwise in communication with computing devices 110 and discussed later in the specification. Input to the game application 124 may be used to control aspects of the game application 124, such as, for example, controlling characters, navigating menus, and control towards completion of one or more game tasks. An input device may include, but is not limited to, a keyboard, a mouse, a joystick, a controller, a game pad, a touchpad, a resistive touchscreen, a capacitive touchscreen, or multi-touch enabled touchscreen. In one or more non-limiting embodiments, one or more input devices are built-in to the computing device 110. In other embodiments, one or more input devices are directly or indirectly connected to the computing device 110 with a wired or wireless connection. The physical components and/or protocols utilized to establish and maintain one or more connections between an input device and computing device 110 can be standards-based, non-standards-based, or proprietary.

Computing devices 110 may present the visual content provided by the game application 124 on one or more display devices that are built-in to or external to and in communication with computing devices 110, such as display 270. Display 270 is an output device configured to present information in a visual form. In particular, display 270 may present visual content provided by the game application 124, graphical user interface ("GUI") elements, text, images, video, notifications, virtual buttons, virtual keyboards, messaging data, Internet content, device status, time, date, calendar data, preferences, map information, location information, and any other information that is capable of being presented in a visual form.

Game application 124 may be configured to call one more methods exposed by the gaming service API 126 to access gaming service 108 via the network 400 to take advantage of one or more of the features provided by gaming service 108. Game application 124 can also be configured to call one or more methods exposed by the cloning service API 128 to access the cloning service 106 via the network 104. Cloning service API 128 can access the copying component 130 to provide data to the cloning service 106 and receive data from the cloning service 106 during a cloning session.

Figure 3:
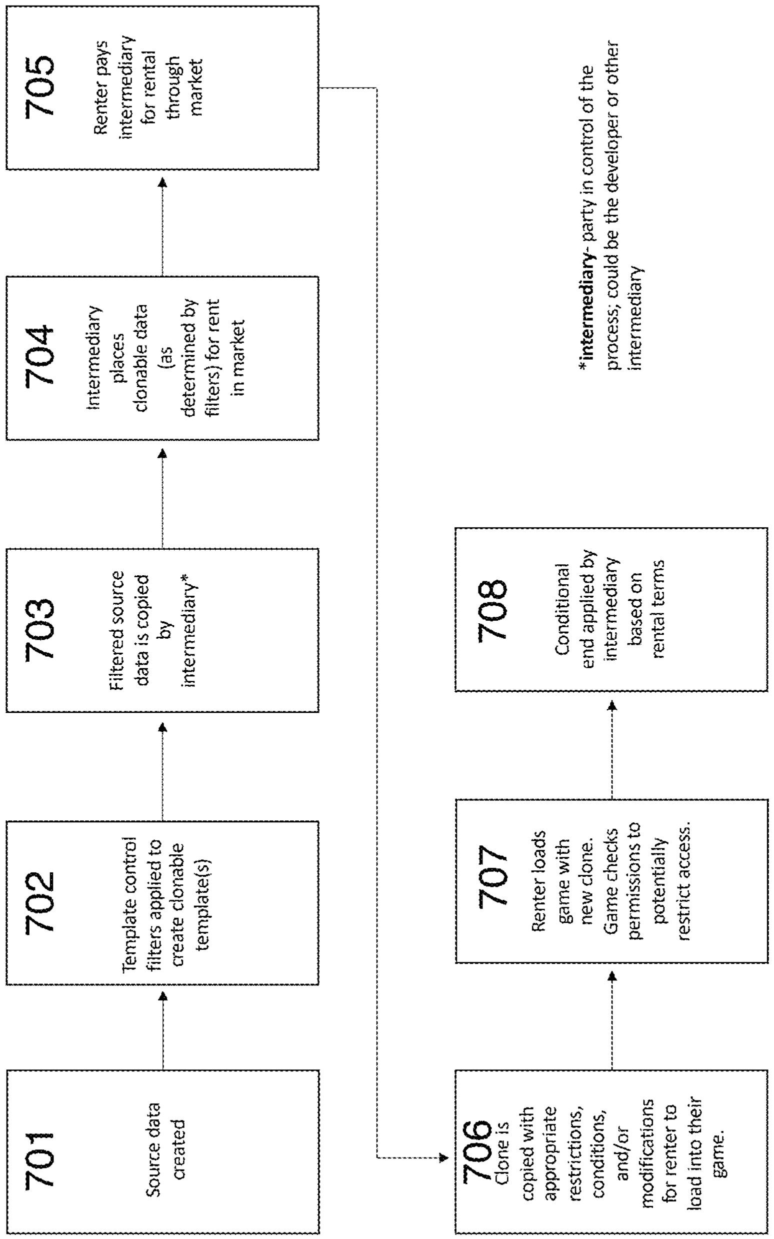
FIG. 3 shows an exemplary flow diagram of the interactive character cloning system.

As discussed for one reason or another, a user 101 may be unable to participate practically in the completion or initiation of a game task. For example, the game task may be too difficult for the player to complete in their spare time because of other duties in their life, the player lacks the time required to complete the game task, or for any number of other reasons. As a solution, users 101 may copy a virtual character or asset of another user 101 such that the user 101 may join in a party with another user 101 to complete a game task using the cloned virtual character. In operation, this may appear similar to older cooperative games such as Halo® where there are two master chief characters. FIG. 3 illustrates one method of the interactive virtual character system 100.

Game application 124 may be created by a human developer or AI and may provide one or more game tasks that can be completed by one or more users 101 whereby operation of users 101 navigating game application 124, creates source data such as by character creation, progression, or by acquiring in game assets such as weapons, items, gestures, loot, or other virtual assets at step 701.

Cloning service then may create one or more templates using one or more template control filters at step 702. Templates are defined as structures or outlines that serve as a basis for creating the virtual assets. These templates can range from simple forms to complex layouts depending on the virtual asset that needs to be cloned or replicated. The template control filters may control their content, appearance, or behavior. The template control filters may include content filters that provide rules that specify what type of content can be included in specific template sections. This may be based on the developer of game application 124 such that some virtual sub assets may not be copied causing the difficulty of game application 124 to be warped, either by becoming too easy or too difficult or otherwise compromising the integrity of the video game. Other examples may include cloning the character to be at a slightly lower level or higher level depending on the amount of the rental of user information of user 101*b*. The template control filters may include formatting filters which are guidelines for how virtual assets should be formatted within the template (e.g., colors, style). For instance, the clone may be slightly modified for recognizable distinction between two or more characters. The template control filters may include behavioral filters which are rules dictating how users can interact with or modify the virtual asset.

Interactive virtual character cloning system 100 may include adaptive gameplay integration features. Game mechanics may recognize cloned characters and dynamically adjust difficulty, tutorial information, or available interactions based on the rental context. Special in-game zones, events, or missions may be designed specifically for users with rented characters, providing tailored experiences that showcase the unique capabilities of high-level characters without disrupting game balance.

Accessibility features may be incorporated into some embodiments to ensure that rental users 101*b* of all skill levels can effectively utilize high-level rented characters. Simplified control schemes can distill complex character mechanics into more approachable interfaces, while character-specific tutorials guide users through optimal ability usage and strategic approaches. These accessibility options may be particularly beneficial for casual gamers, older players, or users with disabilities who may otherwise struggle with complex character mechanics.

Further a developer or user 101 may create rules associated with the cloned or copied virtual assets on a computing device or they may be uploaded from a third-party source. The rules can be positive rules (e.g., indicating what the user is permitted to do or access with the cloned assets) and/or negative rules (e.g., indicating what the user is prohibited from doing or accessing with the cloned assets). For example, some rules may specifically identify game applications that the user may access, view, and/or collaborate in game-playland/or may specifically identify game applications that the user is prohibited from accessing, viewing, and/or collaborating in game-play.

Once a template is defined and filters are applied, the system allows for the creation of cloneable instances of these templates which includes replicating the template's defined structure and layout and ensuring that all control filters are applied to maintain consistency and adherence to template guidelines, while also allowing users to customize cloned templates within the boundaries set by the filters. Filtered source data is copied by an intermediary who may be a developer or other party at 703.

At step 704, gaming service 108 may provide a marketplace through gaming service application 120 or operating system 122 through which users 101 can rent virtual assets that have been uploaded by the intermediary, such as, for example, characters, weapons, items, gestures, game add-ons, in-game items, music, or other assets for a predetermined amount of time. The marketplace permits users 101 to provide a user interface to view other users' virtual assets that are available for cloning rentals and collaborate with other users in gaming sessions such as events with streamers and/or influencers whereby they may also filter for specific virtual assets or users using a search bar or checklist.

Real currency or in some embodiments virtual currency may be exchanged as compensation by user 101*b* of computing device 110*b* for a copied virtual asset that may be rented from the marketplace at step 705. In some embodiments, user 101*a* may be compensated for providing virtual assets on the marketplace whereby a percentage of the real currency will also be transmitted to interactive virtual character system 100. Compensation may include, but is not limited to, real currency, virtual currency, one or more in-game items for the game application 124, one or more in-game items for another game application, and credit for the purchase of real or virtual products from the marketplace or a separate marketplace such as Steam® or Epic Games®.

The marketplace provided by gaming service 108 may include expanded social and community features in some embodiments. Source users 101*a* may maintain character showcase profiles highlighting their virtual characters' achievements, unique attributes, and rental availability. A rating and review system enables rental users 101*b* to evaluate their experience with specific rented characters, building reputation metrics that inform future rental decisions. Community challenges and tournaments may feature opportunities for users to rent professional players' characters, creating unique competitive and learning experiences.

In some non-limiting embodiments, user 101*a*, who may be a streamer or influencer that is donating to a charity may set up an auction for users 101 to bid on the ability to rent cloned virtual assets of theirs. The auction feature can be hosted by the gaming service 108. Users 101 of the gaming service 108 can bid on the auction and user 101 can select a bid as the winning bid.

In further non-limiting embodiments, user 101*b* that is playing the game application 124 on the computing device 110*b* may be presented with a selectable icon on user interface 115 and can send a request to rent one or more virtual assets on the marketplace. The marketplace may accept or deny the copy request. If the marketplace accepts the copy request, user 101*b* may receive the copied one or more virtual assets of user 101*a* on computing device 110*b*. The clone is then copied with appropriate restrictions, conditions, and/or modifications for user 101*b* to load into gaming service application 120 whereby computing device 110*b* communicates with the cloning service 106 to create the cloning session 112 to play with the copied virtual asset at step 706. Game application 124 may also check permissions to potentially restrict access depending on the need and circumstances at step 707. In further embodiments they may request separate virtual asset from separate users or other types of entities such as artificial intelligence.

Once a game state is loaded with the copied asset, game application 124 may provide input to the computing device 110*b* via one or more input devices that are connected to or otherwise in communication with the computing device 110*b* to play the game application 124 with copied assets. User 101*b* may then be given a finite amount of time to play game application 120 based on the rental agreements at step 708. This conditional end may be set/controlled by user 101*a* or the developer. For example, "We are doing a 4-hour shotgun run beginning at 8:00 pm EST." The rental period would then end at 12:00 am EST and user 101*b* would no longer have access to the cloned virtual assets. They may stay however downloaded onto computing device 110*b* such that the next time they rent the virtual assets, they may already have access to them without downloading the virtual assets again.

Figure 4:
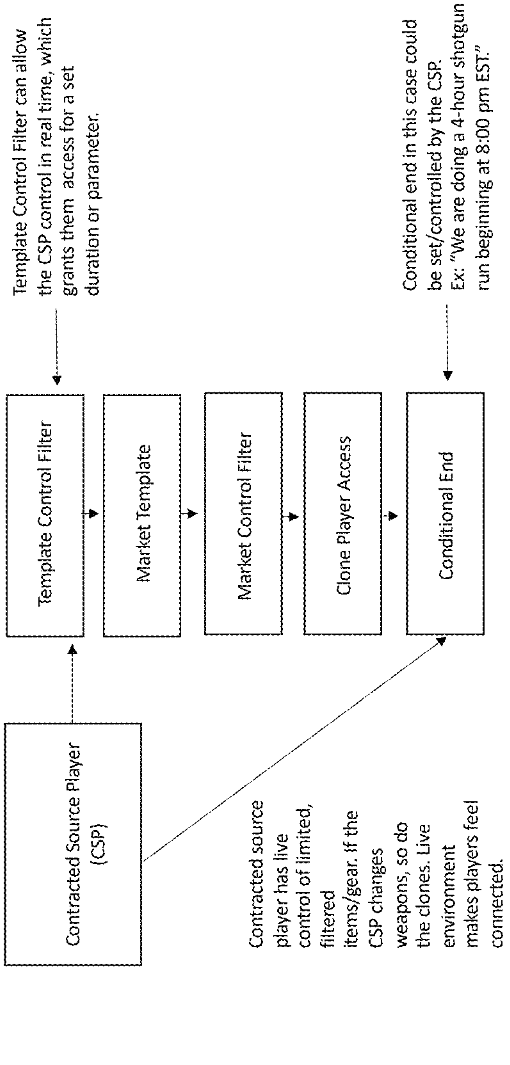
FIG. 4 shows another flow diagram of the interactive character cloning system.

In one or more non-limiting embodiments, as illustrated in FIG. 4, user 101*a* may be provided one or more live controls of their virtual assets during a gameplay session whereby when user 101*a* changes or modifies the virtual assets, so do the clones, whereby the cloning service or game service receives the updates to user 101*a* from computing device 110*a*, translates the data, and then transmits the updated data to computing device 110*b* which is then reflected on the cloned character. This may happen automatically or may need to be confirmed by user 101*b* through user interface 115. During operation, as illustrated in FIG. 4, contracted source user 101*a* has live control of limited, filtered items/gear. If contracted source user 101*a* changes weapons, so do the clones.

In another example, computing device 110*a* is presented with an option on user interface 115 whereby interactive virtual character system 100 generates a copying invitation and computing device 110*a* sends the invite to gaming service 108. The invite may be addressed to the user 101*b*. For example, user 101*a* and user 101*b* may be in a friendship or party within the gaming service 108, and the friendship allows users 101*a* to send the invite directly to user 101*b* via a messaging feature provided by the gaming service 108. A friendship in context of the gaming service 108 is a relationship between two users facilitated by the gaming service 108 that allows the users to connect to play multiplayer games, chat, and send messages to each other, including, for example, invites such as the invite. User 101*b* may then view the price and any rental terms and choose to accept the copying invitation. Once the invite is accepted, the game application 124 can call the cloning service API 128 to establish the cloning session 112 to copy one or more virtual assets for user 101*b* utilize during a gameplay session on computing device 110*b*. During this operation, user 101*b* may then be charged in real or virtual currency for the rental of the virtual assets of user 101*a* based on the rental agreement.

In another example, computing device 110*b* is presented a selectable icon on user interface 115 and interactive virtual character system 100 generates a copying request whereby computing device 110*b* sends the request to the gaming service 108. The request can be addressed to the user 101*a*. Once the request is accepted, the game application 124 can call the cloning service API 128 to establish the cloning session 112 to copy one or more virtual assets for user 101*b* to utilize during a gameplay session on computing device 110*b*. During this operation, user 101*b* may be charged in real or virtual currency for the rental of the virtual assets of user 101*a* based on the rental agreement.

The system may offer time-shifting visualization, allowing rental users 101*b* to access historical versions of characters at specific points in their development. This feature enables users to experience characters as they existed at particular points in game history, such as during special events or after significant updates. Recording functionality may capture gameplay sessions with rented characters, allowing source users 101*a* to review how their characters were utilized and providing rental users 101*b* with a record of their temporary experience.

In additional embodiments, the interactive virtual character cloning system 100 may incorporate cross-platform functionality, allowing users to rent and utilize virtual characters across different gaming platforms. The system may include translation modules that convert character attributes, abilities, and assets between different game engines and platforms, ensuring compatibility between console, PC, mobile, and cloud gaming environments. This cross-platform integration enables users to access rented characters regardless of their preferred gaming device, expanding the potential marketplace and increasing accessibility.

Some embodiments of the interactive virtual character cloning system 100 may incorporate artificial intelligence components to enhance the character rental experience. An AI analysis module may observe and record the play style, decision-making patterns, and tactical preferences of source users 101*a*, creating behavioral profiles that can be applied to cloned characters. This allows rental users 101*b* to experience not just the statistical attributes of a character but also gain insights into how skilled players utilize those characters. The AI system may also include recommendation engines that suggest optimal rental characters based on a user's play history, preferences, and current game objectives.

Figure 2:
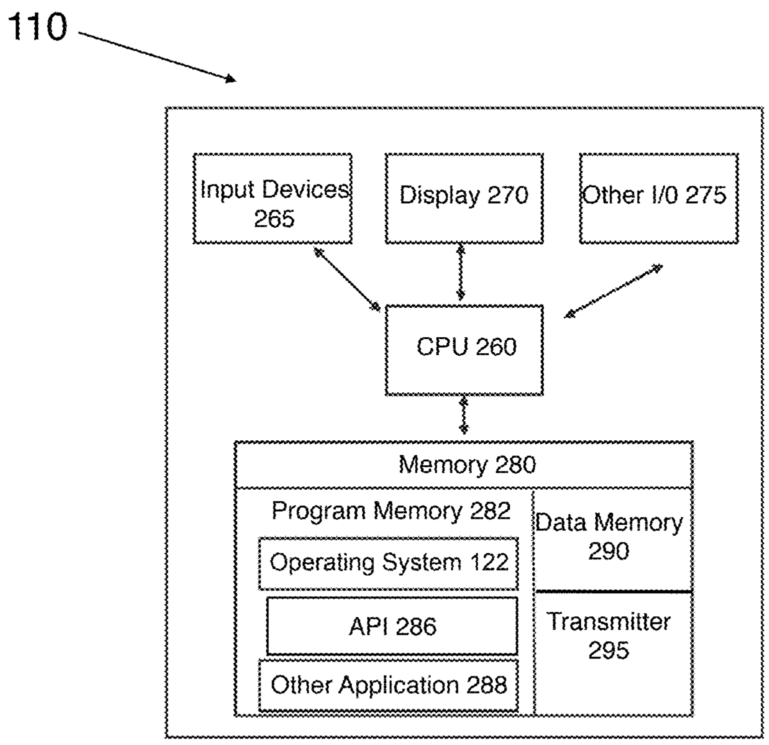
FIG. 2 shows an exemplary block diagram of various components of a computing device.

Turning to FIG. 2, FIG. 2 is a block diagram showing various components of a computing device 110. Computing device 110 may include a housing for holding one or more hardware components that allow access to edit and query interactive virtual character system 100. Computing device 110 may include one or more input devices such as input devices 265 that provide input to a CPU (processor) such as CPU 260 of actions related to a user 101. Input devices 265 may be implemented as a controller, a joystick, a keyboard, a touchscreen, a mouse, via voice activation, wearable input device, a camera, a trackball, or a microphone.

The actions may be initiated by a hardware controller that interprets the signals received from input device 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen or an LED display screen. Display 270 may also include a touch screen interface operable to detect and receive touch input such as a tap or a swiping gesture.

Display 270 may be a binocular head mounted display (HMD), head mounted goggles (HMG), an augmented reality device, virtual reality glasses, a scope simulator, a hologram projector, a monocular simulator, a binoculars simulator, a telescope simulator, Google Glass™, or another form of device that is connectable to the computing device whereby users may view a virtual environment through the display. Interactive virtual character system 100 may also use any latest video and audio rendering technologies to accomplish the goal of the present invention instead of or in combination with virtual reality or augmented reality.

In some embodiments, the computing device 110 may be capable of displaying an augmented reality view through a camera, sensor, or other method. The system may have a creation module that may be configured so that users 101 may interact with the virtual character in an augmented reality view by inserting annotations, comments, virtual objects, pictures, audio, and video to locations within range of the event or the device. The virtual objects may include virtual characters or static virtual objects, and any other virtual objects that can be rendered by the augmented reality networking system.

In one or more non-limiting embodiments, display 270 may be a mobile device or other device. The camera of a mobile device may capture video of the surrounding area so that user 101 may interact with the augmented reality view by inserting annotations, comments, virtual objects, pictures, audio, and video to locations within range of computing device 110. The virtual objects may include virtual characters, static virtual objects, and any other virtual objects that can be rendered by the augmented reality networking system built within the system.

Other I/O devices such as I/O devices 275 may also be coupled to the processor, such as a network card, video card, audio card, USB, FireWire or other external device, camera, printer, speakers, CD-ROM drive, DVD drive, disk drive, or Blu-Ray device. In further non-limiting embodiments, a display may be used as an output device, such as, but not limited to, a computer monitor, a speaker, a television, a smart phone, a fax machine, a printer, or combinations thereof.

CPU 260 may have access to a memory such as memory 280. Memory 280 may include one or more of various hardware devices for volatile and non-volatile storage and may include both read-only and writable memory. For example, memory 280 may include random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 122. Memory 280 may further include an application programing interface (API), such as API 286, and other computerized programs or application programs such as application programs 288. Memory 280 may also include data memory such as data memory 290 that may include database query results, configuration data, settings, user options, user preferences, or other types of data which may be provided to program memory 282 or any element of computing device 110.

Utilizing these steps, the system allows a player's virtual character or other virtual asset to be cloned or copied for any or all of the events interactions that it has either with the player, other characters, non-player characters (NPCs), or game match experiences/results. User 101 is then permitted to use the cloned virtual character or asset for a predetermined amount of time or until an activity in the game or outside the game occurs. In some non-limiting embodiments, the copied virtual asset or character may be modified based on the system or developer settings in real time with constant updating based on the source player's user remote input from computing device 110*a*.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

What is claimed is:

1. A system for cloning and renting a virtual asset in a video game, comprising:

a server computer system comprising at least one processor and memory storing program instructions executable by the at least one processor to perform operations comprising:

storing source data associated with the virtual asset of a first user;

creating a template for cloning the virtual asset using one or more template control filters that define rules for copying the source data;

generating a filtered copy of the virtual asset based on the source data and the one or more template control filters;

providing a marketplace interface accessible to a plurality of users for listing and renting the filtered copy of the virtual asset;

receiving a rental request from a second user to temporarily access the filtered copy of the virtual asset;

in response to the rental request, establishing a cloning session that enables the second user to use the filtered copy of the virtual asset for a predetermined rental period; and terminating the second user's access to the filtered copy of the virtual asset when the predetermined rental period ends.

2. The system of claim 1, wherein the one or more template control filters comprise at least one of:

content filters that specify what type of attributes are included in the filtered copy;

formatting filters that specify visual distinctions between the virtual asset and the filtered copy; and behavioral filters that specify how the second user can interact with the filtered copy.

3. The system of claim 1, wherein the operations further comprise:

receiving, during the cloning session, updates to the virtual asset made by the first user;

translating the updates into corresponding modifications for the filtered copy; and applying the corresponding modifications to the filtered copy in real-time.

4. The system of claim 1, wherein the operations further comprise:

restricting the filtered copy from accessing at least one of: in-game events, trading functions, marketplace functions, player-versus-player functions, and communication functions.

5. The system of claim 1, wherein the predetermined rental period is a specified time duration.

6. The system of claim 1, wherein the predetermined rental period is a specific in-game task.

7. The system of claim 1, wherein the predetermined rental period is a specific in-game event.

8. The system of claim 1, wherein the operations further comprise:

enabling the second user to search and filter available virtual assets for rental based on attributes including parameters that are comprised of one of the following: level, cosmetics, skills, equipment, reputation, power, inventory, currency, and achievements.

9. The system of claim 1, wherein the operations further comprise:

analyzing level data of the virtual asset of the first user; and adjusting a level of the filtered copy based on a relative skill level between the first user and the second user and then applying the adjusted level to the filtered copy before providing access to the second user;

generating multiple filtered copies of a same virtual asset at different level adjustments;

displaying the multiple filtered copies in the marketplace interface with different rental prices based on the different level adjustments; and scaling the level to match a target game difficulty.

10. A method for temporarily providing access to a virtual asset in video games, comprising:

storing, by a computer system, source data associated with the virtual asset of a first user;

generating, by the computer system, a filtered copy of the virtual asset based on template control filters;

listing, by the computer system, the filtered copy on a marketplace accessible to a plurality of users;

receiving, by the computer system, a rental request from a second user to temporarily access the filtered copy; and establishing, by the computer system, a cloning session that enables the second user to use the filtered copy for a predetermined rental period.

11. The method of claim 10, further comprising:

synchronizing, during the cloning session, changes made to the virtual asset by the first user with the filtered copy used by the second user.

12. The method of claim 10, wherein the template control filters modify at least one attribute of the virtual asset in the filtered copy relative to the virtual asset of the first user.

13. The method of claim 10, wherein the predetermined rental period is based on a specific gaming session or event involving the first user.

14. A system for enabling sharing of assets in video games, comprising:

a marketplace interface configured to display virtual assets available for temporary use;

a filtering module configured to generate filtered copies of the virtual asset based on template control filters;

a rental processing module configured to handle transactions between virtual asset owners and renters; and a cloning session manager configured to establish temporary access to the filtered copies for the renters.

15. The system of claim 14, further comprising a synchronization module configured to update the filtered copies in real-time based on changes made to original virtual assets by their owners.

16. The system of claim 14, further comprising: a permission management module configured to restrict the filtered copies from accessing specific game functions based on rules set by game developers or the virtual asset owners.

17. The system of claim 14, further comprising: an invitation module configured to:

present a selectable icon on a user interface of a computing device of a first user;

receive a selection of the selectable icon;

generate a copying invitation in response to the selection;

transmit the copying invitation to a second user via a gaming service; and enable a computing device of the second user to display rental terms including at least a price and a rental duration; and process an acceptance input from the second user; wherein the cloning session manager establishes a cloning session between the first user and the second user in response to the acceptance input.

18. A system for enabling virtual asset rentals through application programming interfaces, comprising:

a computing device configured to execute:

a game application that provides an interactive video gaming experience;

a gaming service application programming interface (API) configured to communicate with a gaming service; and a cloning service API configured to communicate with a cloning service;

wherein the game application is configured to:

utilize the gaming service API to access features provided by the gaming service including online gaming;

call one or more methods exposed by the cloning service API to:

initiate a cloning session with the cloning service;

provide virtual asset data to the cloning service;

receive filtered virtual asset data from the cloning service for use by a requesting user;

load the filtered virtual asset data into a game state of the game application; and enable the requesting user to control the filtered virtual asset within the game application for a predetermined rental period.

19. The system of claim 18, further comprising: a cloning component executed by the computing device and configured to:

interface between the cloning service API and the game application;

manage data transformations between formats used by the game application and formats required by the cloning service; and handle authentication processes required to establish secure communication with the cloning service.

20. The system of claim 19, wherein the game application implements permissions checking through the gaming service API to verify rental authorization before loading the filtered virtual asset data; and the permissions checking includes validating at least one of: rental duration, rental payment status, content restrictions, or game mode restrictions.

21. The system of claim 20, wherein: the gaming service API and the cloning service API operate together to synchronize updates between an original virtual asset and the filtered virtual asset controlled by a second user.

22. The system of claim 21, wherein when changes are made to the original virtual asset during the cloning session, the changes are: transmitted via the cloning service API; processed by the cloning service; filtered according to template control filters; and applied to the filtered virtual asset in real-time.

23. The system of claim 21, wherein the game application is further configured to initiate a second cloning session with the cloning service;

provide a second virtual asset data to the cloning service;

receive filtered second virtual asset data from the cloning service for use by the requesting user;

load the second filtered virtual asset data into the game state of the game application; and enable the requesting user to control the second filtered virtual asset within the game application for the predetermined rental period along with the filtered virtual asset.

24. The system of claim 21, wherein the system provides for multiple assets wherein a second filtered virtual asset comes from a different source than the filtered virtual asset.

* * * * *